Sept. 29, 1959 R. K. ORTHUBER ET AL 2,906,885
APPARATUS FOR DETECTING HOT JOURNAL BOXES
Filed June 2, 1955 2 Sheets-Sheet 2
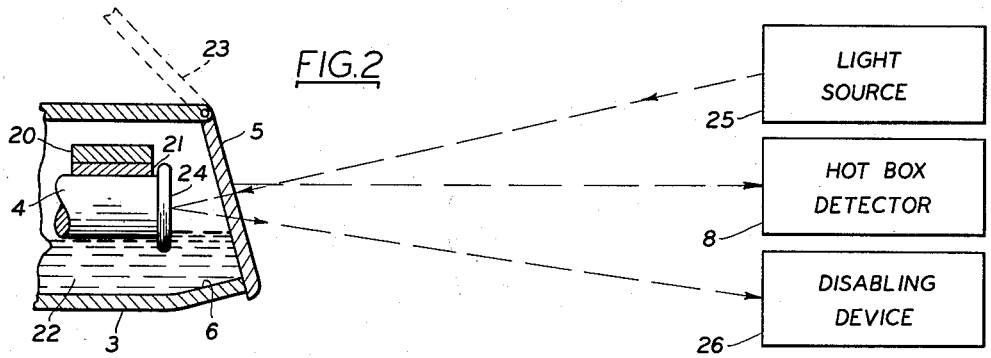
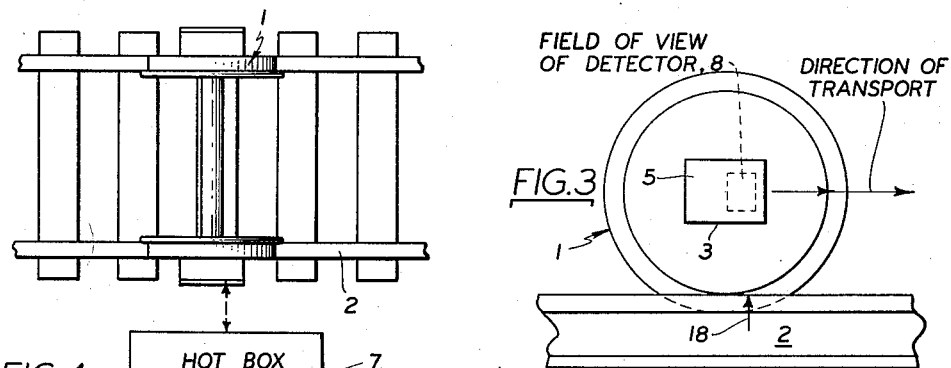
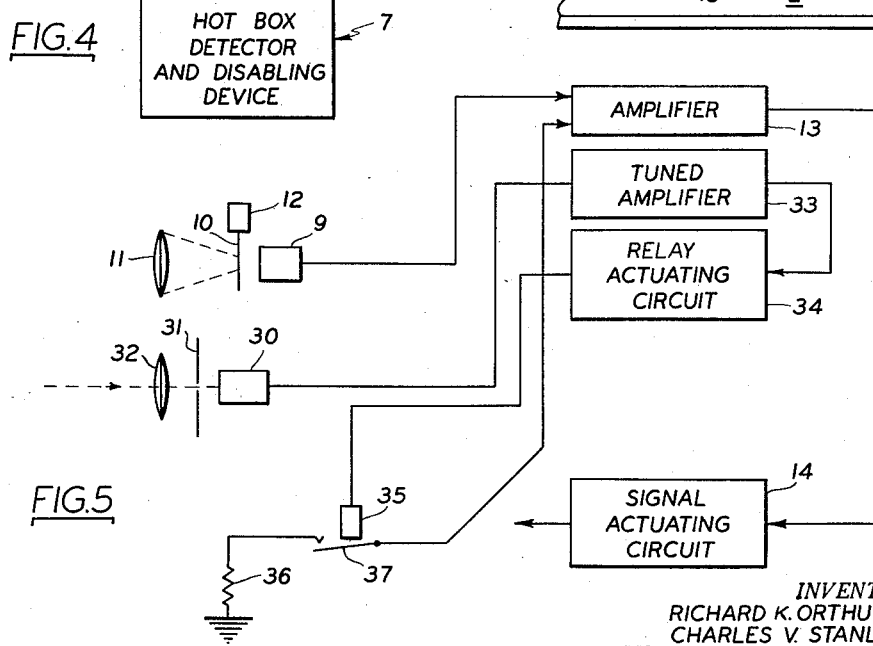
INVENTORS.
RICHARD K. ORTHUBER
CHARLES V. STANLEY
BY SAMUEL G. FONG
George R. Just
ATTORNEY

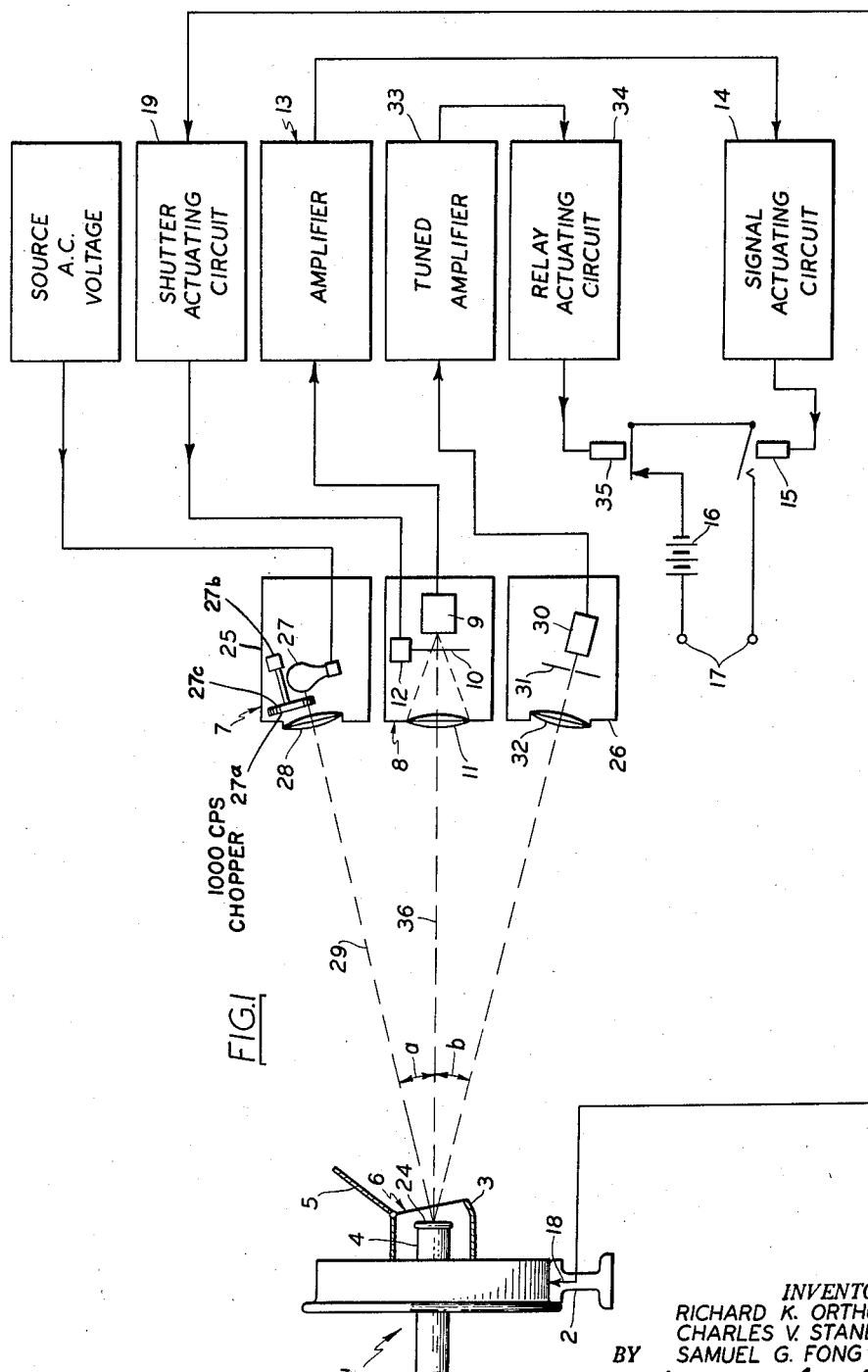

United States Patent Office 2,906,885
Patented Sept. 29, 1959

2,906,885

APPARATUS FOR DETECTING HOT JOURNAL BOXES

Richard K. Orthuber, Charles V. Stanley, and Samuel G. Fong, Fort Wayne, Ind., assignors to International Telephone and Telegraph Corporation Application June 2, 1955, Serial No. 512,802

9 Claims. (Cl. 250—222)

The present invention relates to apparatus for detecting hot journal boxes, and more particularly to apparatus for providing an indication of the presence of a dangerously hot journal box.

Almost all trains now operating utilize journal boxes for housing the bearing-supported axle ends of train trucks. These boxes are provided with end closure lids which may be opened to gain access to the axle end and bearing. Conventionally, in order to find an overheated journal box, workers manually feel the journal box lids immediately following a train stop. Through experience, the worker has determined that if the lid temperature is too high, the journal bearing is in need of closer inspection and probably repair.

Certain automatic apparatus for measuring journal box temperatures utilize the heat energy radiated from the lids. Therefore, the apparatus for all essential purposes replaces the worker in determining lid temperature, so that the lid itself must be closed or otherwise properly positioned with respect to the journal box in order to obtain an accurate indication.

Apparatus of this character is disclosed and claimed in Orthuber-Stanley application Ser. No. 405,944, now Patent No. 2,856,539, filed January 25, 1954, and entitled "Application and Method for Detecting Overheated Journal Boxes," and Orthuber-Stanley application Ser. No. 497,846, filed March 30, 1955, and entitled "Apparatus for Detecting Overheated Journal Boxes."

In normal train operation, even though it is against good practice, some journal box lids are inadvertently left open, while other lids are missing. Detecting apparatus of the type just mentioned possesses the operating characteristic of responding to both open and closed journal boxes; therefore, it is necessary in order to obtain consistently accurate results in measuring journal box temperatures that these two conditions be automatically discriminated.

It is therefore an object of this invention to provide apparatus for detecting hot journal boxes which discriminate between open and closed journal box lids.

It is still another object of this invention to provide an apparatus for detecting hot journal boxes wherein a first detector measures the temperature of a closed journal box lid and a second device serves to disable the first device when the journal box lid is open.

A practical embodiment of the invention resides in an apparatus comprising a heat-sensitive device operative to produce an electrical signal which may be utilized for operating a warning or stop signal, first means for directing heat energy from a moving journal box onto the heat-sensitive device, and second means operatively coupled to the heat sensitive device for selectively disabling the latter in response to radiation emanating from a journal box having an open lid.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a diagrammatic illustration in vertical elevation of one embodiment of this invention;

Fig. 2 is a fragmentary illustration in vertical section of a typical journal box;

Fig. 3 is a vertical elevation of a train wheel riding on a track;

Fig. 4 is a top plan view of a typical truck on rails showing the position of the hot box detector in relation thereto; and Fig. 5 is a circuit diagram of an alternative arrangement.

Referring to the drawings, a typical train truck is indicated by the reference numeral 1 as rolling on a rail 2. A conventional journal box 3 encloses the axle end 4 and is provided with a hinged lid 5 (shown in open position in Fig. 1) which closes the journal box opening 6.

Mounted to one side of the tracks as seen in Figs. 1 and 4 is the apparatus for determining the temperature of the journal box 3, this apparatus being indicated generally by the reference numeral 7. A device for automatically sensing or measuring the temperature of the journal box is indicated by the numeral 8 and comprises an infra-red ray detector (bolometer) 9, an optical shutter 10, and suitable focusing lens 11. This device 8 is fully disclosed and claimed in Orthuber et al. Ser. No. 405,944, now Patent No. 2,856,539, and Orthuber et al. Ser. No. 497,846, and, insofar as necessary, these disclosures may be considered as being a part of this disclosure. In general, the lens 11 focuses radiation onto the heat-sensitive or infra-red detector 9. A shutter 10 operated by means of a suitable electromagnet 12 is interposed between the lens 11 and detector 9 and normally completely shields the detector 9. When the shutter 10 is operated, it moves to one side and exposes the detector 9 fully to the focused radiation from the lens 11. This shutter 10 is normally closed.

The detector 9, upon being excited by heat energy or infra-red rays, generates an electrical signal which is coupled to a suitable amplifier 13. The amplified signal from this amplifier is fed to a signal-warning circuit 14 which in turn operates a suitable relay 15 for closing a battery-powered circuit 16, this latter circuit having output terminals 17 to which may be connected an ordinary red colored signal light. When the relay 15 is closed, a potential will be applied to the terminal 17 for operating the signal light or similar stop signal.

The shutter 10 is actuated (opened) each time a journal box 3 traverses the field of view of the lens 11 and detector 9. The shutter 10 is open only during registration of the journal box 3 with this field of view and is closed at all other times. In order to actuate the shutter 10, a switch device 18 is mounted on or near the rail 2 in order to close a circuit 19 adapted to energize the shutter motor 12. Thus, each time the wheel passes over the switch 18, the actuating circuit 19 is energized, which in turn actuates the shutter motor 10. The switch 18 is so positioned that opening of the shutter 10 is synchronized exactly with movement of the journal box 3. This synchronizing feature is fully disclosed in the preceding Orthuber et al. applications.

Briefly explaining the operation of the invention thus far described, the lid 5 is normally closed, and it is the temperature of this lid which is utilized for determining the heated condition of the journal bearing. Assuming an overheated journal box, and the fact that the truck 1 is rolling on the rail 2, the moment the wheel actuates the switch 18 the shutter 10 is opened. Simultaneously, the lid 5 is positioned in full view of the lens 11 and detector 9, whereupon heat energy from the lid 5 causes the detector 9 to produce a signal. This signal is amplified by the amplifier 13 and fed to the signal actuating circuit 14, which, if the signal indicates an abnormally high lid temperature, in turn generates a signal for closing the relay 15. Upon closure of this relay 15, a voltage is applied to the terminals 17 which may be utilized for operating any type of an alarm or signalling device for warning the train operators that a dangerously hot journal box is present. Just prior to the journal box passing out of the field of view of the detector 9, the circuit 19 closes the shutter 10. Regardless of the speed of the train, the shutter 10 is opened for a predetermined period of time so that an accurate and predetermined time of exposure may be viewed by the detector 9.

In Fig. 2 is illustrated in slightly more detail the construction of a typical journal and box. The vehicle frame 20 rests on a part cylindrical bearing 21 which is cradled on the upper part of the axle end 4. Suitable oil-impregnated waste 22 is carried in the bottom of the box 3 in rubbing contact with the axle 4 for providing bearing lubrication. The lid 5 may be opened to the dashed line position 23 for changing the waste 22 or for effecting minor repairs to the bearing. Normally, the end 24 of the axle is machined or highly polished, and this condition is utilized in this invention as will be explained in the following. It often occurs during normal train operation that the journal box lid 5 is open or is missing entirely. It is also true that the temperature of the axle end 24 is considerably higher than that of the lid 5. As a matter of fact, the temperature of the end 24 for a normal-running bearing is so high that when viewed by the heat-sensing device 8 an indication of a dangerously hot journal box is usually given. While an open journal box is not desired, it so happens that the condition is not sufficiently serious to require train stoppage. Therefore, during normal operation of the sensing apparatus 8, each time an open journal box passes the field of view of the detector 9, a warning signal indicating a dangerous journal condition may be given. The obvious result of this would be the unnecessary stopping of a train just for the purpose of closing a journal box lid. Therefore, apparatus for detecting dangerously hot journal boxes must, in order to be economically practical in use, discriminate between open and closed boxes.

This invention includes discriminating apparatus of a type which renders the heat-detecting device practicable and efficiently useful. The discriminating apparatus is composed, first, of a light source 25 and a receiver or disabling device 26. A light source 25 is positioned adjacent the detector 8 and includes a suitable lamp 27 and a lens 28 which focuses light into the vicinity of the axle end 24 as indicated by the dashed line 29. The receiver 26 comprises a photosensitive device such as a conventional photoelectric cell 30, a light stop 31, and a lens 32 having its optical axis coinciding with the line of sight between the photoelectric cell 30 and the axle end 24. The purpose of the lens 32 is to focus light from the lamp 27 as reflected from the axle end 24 onto the photoelectric cell 30.

In the preferred embodiment, the lamp 27 is modulated at a suitable rate, such as one thousand (1,000) cycles per second or above. Gaseous discharge lamps which are capable of cycling on and off at suitably high rates are known. However, a steady light source 27 may be used in conjunction with a chopping wheel 27a driven by a motor 27b. The wheel 27a is provided with a series of spaced apertures 27c and the opaque material between adjacent apertures serves to interrupt the beam 29 at a predetermined rate, such as 1,000 cycles per second. This light chopper is composed of a simple motor-driven disc having alternate, circumferentially arranged transparent and opaque portions which pass through the path of the beam 29. Thus, the photo-cell 30 receives a modulated beam of light.

The photo-cell 30 is connected to an amplifier 33 which is tuned to the frequency of the modulated light 27. The amplifier 33 contains suitable band-pass circuits which exclude signals of all frequencies other than the frequency of the source 27.

The output signal of amplifier 33 is coupled into a relay actuating circuit 34 which is adapted to produce a single pulse of energy for operating a normally closed relay 35. The normally closed contacts of this relay 35 are connected in series with the battery 16 so that when the relay 35 is energized, the battery circuit to the terminal 17 will be broken or disabled. The actuating circuit 34 may be conventional and comprise a thyratron triggering circuit or a one-shot multivibrator, either of which being triggered into generating a single pulse upon receiving a signal from the amplifier 33.

The lens 32 and the stop 31 cooperatively provide an aperture of such size that during the opening of the detector shutter 10 substantially only the journal or box lid 5 fills the aperture of the stop 31.

The souce 25 and light receiver 26 are properly positioned with respect to the axle end 24 to provide equal angles of incidence and reflection as indicated by the reference letters "a" and "b" as measured from the center line 36 coextensive with the axis of the axle 4.

The heat-sensing apparatus and its associated circuitry is adjusted so that it will operate some warning device or alarm if the journal box lid temperature exceeds the temperature for a normal running journal. However, with the detector so adjusted, almost every open lid, as explained previously, on a normal journal box will actuate the same alarm. This produces considerable inconvenience, since open journal box lids cause the train to be stopped, even though open lids are not considered sufficient reason for stopping a train.

This invention discriminates against open lids and concurrently produces a warning of an incipient or dangerously hot journal box. Generally speaking, the open lid detector 25, 26 serves to cancel the simultaneously occurring signal from the detector 8 which normally would set off an alarm.

This open lid detector 25, 26 utilizes the different reflection properties of a journal box lid and the machined and nearly always clean flat end surface 24 of an axle. Journal box lids are nearly always dirty and poor reflectors of visible, ultraviolet and infra-red light. Even if clean, they are normally painted a dark color, and in addition to their poor reflectivity they reflect diffusely. This difference in light reflection properties may be used to determine if an abnormally high temperature indication produced by the detector 8 is produced by a journal box with a closed lid and therefore indicative of a defective bearing or by a normal journal box with an open or missing lid which would not constitute sufficient cause to stop a train.

The light source 25, receiver 26 and heat detector 8 are so positioned that the beam of visible light from the source 25 illuminates the journal box at the same time it is observed by the detector 8. If a box with closed lid passes through the beam 29 and field of view of the detector 8, the modulated light is deflected diffusely from the lid 5 and only a minor amount of the light, insufficient to cause actuation of relay 35, will be intercepted by the receiver 26.

In the case of an open lid entering the field of view of the detector 8 and simultaneously the modulated beam 29, the modulated light will be reflected from the axle end 24 in a nearly specular manner and therefore will be concentrated toward the receiver 26. Momentarily, the photocell 30 will be highly illuminated and causes actuation of relay 35 which opens the battery circuit to the terminals 17.

Since the light beam is intensity modulated and the amplifier 33 is tuned to the modulating frequency, effects of sunlight or daylight reflected from the journal box are excluded. Due to the short duration of exposure of a journal box on a fast moving train, the frequency of modulation should be chosen so that a sufficient number of modulating cycles are produced during the time of transit of a single box through the detector field of view.

Recapitulating the operation of the invention, when a closed journal box passes the field of view of the detector 8, the infra-red detector 9 will be excited in accordance with the temperature of the box. The amplifier 13 is biased so that should the temperature of the box lid be too high, the amplifier will produce a signal for closing the relay 15 and connecting battery 16 to the terminals 17. During this period of operation, because of the poor reflectivity of the box lid 5, the photocell 30 will not be excited sufficiently. However, should the journal box lid be opened, specular reflection of the incident beam 29 from the axle end 24 will fall on the photo-cell and thereby produce a signal which is amplified by amplifier 33 to cause opening of the relay 35. This disconnects battery 16 from the terminals 17. Simultaneously with the excitation of the photo-cell 30, the detector 8 is seeing a relatively hot surface 24, which triggers the detector 9, amplifier 13, circuit 14, and relay 15 into operation. However, this triggering action is rendered ineffective by reason of the fact that simultaneously therewith the relay 35 has opened the circuit connecting the battery 16 to the terminal 17.

It may now be generalized that the open lid detector 25, 26 serves as a synchronized disabling device for the hot box detector 8. Thus, each time an open journal box passes the field of view of the detector 8, the latter will be rendered ineffective to set a warning or stop signal for the train. At all other times, when the temperature of the closed journal box lid is too high indicating an incipient or dangerously hot journal, the heat-sensitive detector 8 will set the warning or stop signal and the open lid detector 25, 26 will be inoperative so as not to interfere therewith.

In Fig. 5 is illustrated a slightly different arrangement of this invention whereby a dangerously hot journal will be indicated automatically regardless of whether the lid 5 is opened or closed. This embodiment is identical to that illustrated in Fig. 1 except for the differences indicated, and since the embodiment is so similar, only so much of Fig. 1 has been reproduced as is necessary to obtain a clear understanding.

The amplifier 13 (Fig. 5) is biased in the usual manner, for example, by means of a fixed resistor (not shown). The value of this resistance is selected such that too high a temperature for the journal box lid 5 will actuate the amplifier into producing a signal for utilization by the circuit 14. As mentioned earlier when a journal box lid is open, the axle end 24 falls into the field of the detector 9, and since a normal bearing heats the axle end to a high temperature, a temperature normally interpreted by the detector 9 and amplifier 13 as "too hot," it is necessary to compensate for the differences in temperature between open and closed boxes if it is desired to determine whether or not the journal of an open box is dangerously hot.

As seen in Fig. 5, an auxiliary biasing resistor 36 is shunt connected into the amplifier 13 by means of a normally open relay switch 37. When an open lid passes the field of view of the photo-cell 30, the associated apparatus 33, 34 and 35 operates the same as explained in connection with Fig. 1 to close the switch 37 and to place the biasing resistor 36 in the circuit or amplifier 13. The value of this biasing resistor 36 is so selected as to reduce momentarily the gain of the amplifier to a value that normal bearing temperature as measured on axle end 24 will not cause actuation of circuit 14, but on the other hand to actuate circuit 14 when the axle end 24 is above its normal temperature due to a dangerously hot bearing. Thus, if the axle end 24 is too hot, representing a dangerously hot bearing, the amplifier 13, controlled by the biasing resistor 36, will provide a positive indication of this dangerous condition and will set the warning signal the same as it would in the event the lid 5 temperature was too hot.

Alternatively, by connecting the resistor 36 in parallel with the input resistor of the amplifier 13, similar operation is achieved in the respect that the gain of the amplifier is reduced. A higher amplitude signal, corresponding to a dangerous bearing when the temperature is read directly from the axle 24, is, therefore, required to operate the signal actuating circuit 14. Thus, if the alternative arrangement of Fig. 5 is used, an indication of a dangerously hot bearing will be given regardless of whether the journal box lid is open or closed.

While we have described above the principles of our invention in connection with specific apparatus, it is to be clearly understood that this description is made only by way of example and not as a limitation to the scope of our invention.

What is claimed is:

1. Apparatus for detecting overheated journal boxes comprising heat-sensitive means operative to produce an electrical signal which may be utilized for operating a warning signal circuit, first means for directing heat energy from a moving journal box onto said heat-sensitive means, and second means for selectively disabling the heat-sensitive means, said second means including radiation-detecting means responsive to radiation of predetermined intensity for generating a disabling signal.

2. Apparatus for detecting overheated journal boxes comprising heat-sensitive means operative to produce an electrical signal which may be utilized for operating a warning signal circuit, first means for directing heat energy from a moving journal box onto said heat-sensitive means, radiation-discriminating means operatively coupled to said heat-sensitive means, second means for directing radiant energy from the aforementioned moving journal box onto said radiation-discriminating means for producing a disabling signal, and disabling means operatively interconnected between said heat-sensitive means and said radiation-discriminating means for disabling the heat-sensitive means when the aforesaid radiant energy falls on said radiation-discriminating means.

3. Apparatus for detecting overheated journal boxes comprising heat-sensitive means operative to produce an electrical signal which may be utilized for operating a warning signal circuit, first means for directing heat energy from a moving journal box onto said heat-sensitive means, second means for limiting the field of vision of said heat-sensitive means to the aforesaid moving journal box only, a photosensitive device positioned to intercept radiation from said moving journal box, and being insensitive to heat energy, said photosensitive device being operatively connected to said heat-sensitive means to disable the latter when the aforementioned radiation falls on said photosensitive device.

4. Apparatus for detecting overheated journal boxes comprising heat-sensitive means operative to produce an electrical signal which may be utilized for operating a warning signal circuit, first means for directing heat energy from a moving journal box onto said heat-sensitive means, second means for limiting the field of vision of said heat-sensitive means to the aforesaid moving journal box only, a photosensitive device positioned to intercept radiation from said moving journal box, and being insensitive to heat energy, radiation source means disposed to project radiation onto said moving journal box at an angle at which the reflection from said journal box or from the axle end will fall on said photosensitive device, said photosensitive device being operatively connected to said heat-sensitive means to disable the latter when the aforementioned radiation falls on said photosensitive device.

5. Apparatus for detecting overheated journal boxes comprising a heat-sensitive means operative to produce an electrical signal which may be utilized for operating a warning signal circuit, first means for directing heat energy from a moving journal box onto said heat-sensitive means, second means for limiting the field of vision of said heat-sensitive means to the aforesaid moving journal box only, a photosensitive device positioned to intercept radiation from said moving journal box, and being insensitive to heat energy, radiation source means disposed to project radiation onto said moving journal box at an angle at which the reflection from said journal box or from the axle end will fall on said photosensitive device, means for modulating the radiation of said source means, and a utilization circuit operatively coupled to said photosensitive device and tuned to the frequency of the aforesaid modulation, said utilization circuit being operative upon actuation by said photosensitive device to produce a disabling signal, said heat-sensitive means and said utilization circuit being operatively connected together whereby said disabling signal serves to prevent said heat-sensitive means from operating the warning signal.

6. Apparatus for detecting overheated journal boxes comprising heat-sensitive means operative to produce an electrical signal which may be utilized for operating a warning signal, first means for directing heat energy from a moving journal box onto said heat-sensitive means, second means for limiting the field of vision of said heat-sensitive means to the aforesaid moving journal box only, a modulated light source disposed to project light onto the aforesaid moving journal box at an angle, a photosensitive device disposed to pick up said modulated light as reflected from said moving journal box, an amplifier tuned to the frequency of said modulated light and connected to said photosensitive device, said amplifier being operatively connected to said heat-sensitive means and serving to disable the latter when reflected light of predetermined magnitude falls on said photosensitive device.

7. Apparatus for detecting overheated journal boxes comprising heat-sensitive means for producing an electrical signal in response to incident heat radiation, first means for directing heat energy from a moving journal box onto said heat-sensitive means, second means for limiting the field of vision of said heat-sensitive means to the aforesaid moving journal box only, a modulated light source disposed to project light onto the aforesaid moving journal box at an angle, a photosensitive device disposed to pick up said modulated light as reflected from said moving journal box, an amplifier tuned to the frequency of said modulated light and connected to said photosensitive device, a warning signal circuit operatively coupled to said heat-sensitive means, and disabling means operatively coupled between said warning circuit and said amplifier for disabling said warning circuit in response to a signal of said amplifier.

8. Apparatus for detecting overheated journal boxes comprising heat-sensitive means for producing an electrical signal in response to incident heat radiation, first means for directing heat energy from a moving journal box onto said heat-sensitive means, second means for limiting the field of vision of said heat-sensitive means to the aforesaid moving journal box only, a modulated light source disposed to project light onto the aforesaid moving journal box at an angle, a photosensitive device disposed to pick up said modulated light as reflected from said moving journal box, an amplifier tuned to the frequency of said modulated light and connected to said photosensitive device, a warning-signal circuit, signal discriminating means operatively interposed between said heat-sensitive means and said warning-signal circuit, and means for actuating said signal-discriminating means in response to a signal produced by said tuned amplifier.

9. Apparatus for detecting overheated journal boxes comprising heat-sensitive means for producing an electrical signal in response to incident heat radiation, first means for directing heat energy from a moving journal box onto said heat-sensitive means, second means for limiting the field of vision of said heat-sensitive means to the aforesaid moving journal box only, a modulated light source disposed to project light onto the aforesaid journal box at an angle, a photosensitive device disposed to pick up said modulated light as reflected from said moving journal box, an amplifier tuned to the frequency of said modulated light and connected to said photosensitive device, a warning-signal circuit, signal discriminating means operatively interposed between said heat-sensitive means and said warning-signal circuit, and a relay operatively coupled between said tuned amplifier and said signal-discriminating means for selectively actuating said signal-discriminating means in response to a signal produced by said tuned amplifier.

References Cited in the file of this patent

UNITED STATES PATENTS

| 2,237,193 | Mobsby | Apr. 1, 1941 |
| 2,486,753 | Miller | Nov. 1, 1949 |
| 2,551,650 | Urbach | May 8, 1951 |
| 2,560,753 | Weinberg | July 17, 1951 |
| 2,625,072 | Clark et al. | Jan. 13, 1953 |
| 2,856,539 | Orthuber et al. | Oct. 14, 1958 |